Oct. 5, 1926.
L. DAVIS
1,601,945
FISHHOOK PROTECTOR
Original Filed May 19, 1925
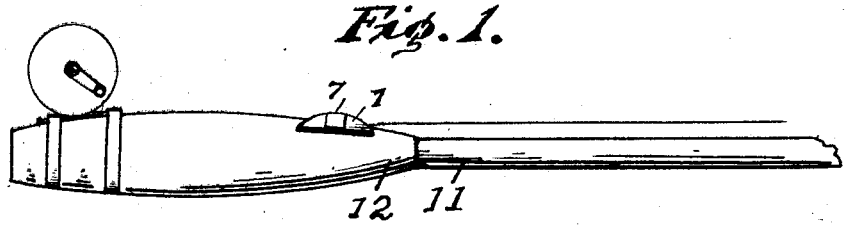
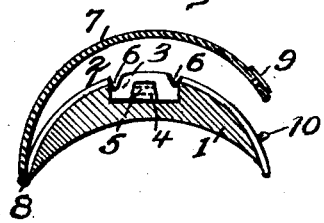
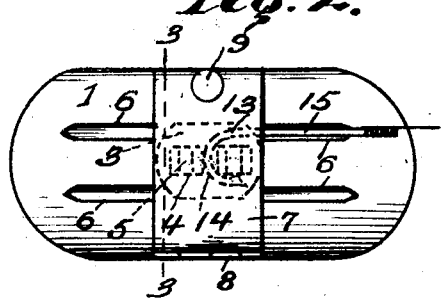
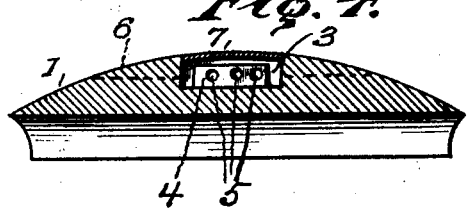
Inventor
L. Davis Patented Oct. 5, 1926.

1,601,945

UNITED STATES PATENT OFFICE.

LOT DAVIS, OF RENTON, WASHINGTON.

FISHHOOK PROTECTOR.

Application filed May 19, 1925, Serial No. 31,444. Renewed March 17, 1926.

This invention relates to a fish hook protector in the use of which the hook may be temporarily held in a fixed relation to the pole to prevent the hook from becoming entangled during the travel of the fisherman from point to point.

The invention comprises a resilient member which may be caused to partially encircle the fishing pole and to be secured thereto at any desired point, the member being formed with a channel to receive the shank of the hook and an opening through which the bill of the hook is passed to retain the hook in temporary fixed relation to the member. A cover is provided which when in closing position substantially conceals and protects the barb of the hook from catching into any obstruction.

The invention is illustrated in the accompanying drawings in which:—

Figure 1 is a view in broken elevation showing a fishing pole with the hook retainer applied thereon.

Figure 2 is an enlarged plan view of the retainer, the hook being shown in position therein.

Figure 3 is a section on line 3—3 of Figure 2.

Figure 4 is a longitudinal section, taken along the longitudinal center line of Figure 3, showing the retaining apertures for holding the hook securely.

The improved hook retainer comprises a flexible member 1, as of rubber or the like, transversely curved and of medium thickness at its longitudinal center, tapering therefrom to a thin and relatively flexible edge. The member 1 is transversely recessed at 2 throughout its full width, and centrally of the recessed portion is formed with a depression 3 projecting upwardly from the bottom of which is a longitudinally extending rib 4. The rib 4 is formed with a plurality of openings 5 of a size to readily accommodate the bill of the hook, and the member 1 in that portion beyond the recess 2 in both directions is formed with V shaped channels 6. These channels extend longitudinally of the member on each side of and slightly beyond the respective longitudinal side walls of the rib 4.

As the member 1 is curved longitudinally as well as transversely the channels 6 open through the surface of the member inwardly of the free ends thereof. A cover 7 is movably connected at 8 to one edge of the member 1, said cover plate 7 being of a size to fit in the recess 2 and provided at its free end with a snap button part 9 cooperating with a complementary member 10 on the member 1 whereby the cover may be held in position to snugly overlie the depression 3 or turn back to expose such depression. In use the member 1 is secured to the fishing rod 11 preferably on the hand grip portion 12 thereof. The member is preferably secured by a proper cement and it is to be particularly noted that by reason of the resilient flexible end of the member 1 it may readily accommodate itself to fishing rod parts of different diameters. With the member 1 secured in position the hook 13 is arranged in temporary fixed relation to the member 1 passing the bill 14 of the hook through the opening 5 and permitting the shank 15 of the hook to rest in one of the channels 6. The cover 7 is then turned down into closing position and its free edge secured in place. The hook is then securely retained against accident and displacement and obviously cannot provide an entangling obstruction in the moving of the fish hook from place to place.

When desired for fishing purposes the hook may be readily removed in an obvious manner, it being apparent that after the removal of the hook the cover may be replaced, thus presenting a smooth outer surface so far as the member 10 is concerned to avoid obstruction.

By reason of the plurality of openings 5 it is apparent that hooks with shanks of different lengths may be readily accommodated.

Claims:

1. A protector for fish hooks comprising a flexible member adapted to be secured to the fishing pole and formed with a transverse recess, a cover movably secured to the member and having said recess, the bottom of the recess being formed with a depression and an integral rib rising from the bottom of the depression and formed with a transverse opening.

2. A protector for fish hooks comprising a flexible member adapted to be secured to the fishing pole and formed with a transverse recess, a cover movably secured to the member and having said recess, the bottom of the recess being formed with a depression and an integral rib rising from the bottom of the depression and formed with a transverse opening, the upper surface of the member beyond the recess being formed with longitudinally extending channels to receive the shank of the hook.

3. A fish hook protector comprising a rubber member adapted to be cemented to a fishing pole said member being formed with a transverse recess having a depression centrally thereof a rib integral with and rising from the bottom of the depression and formed with a transverse opening to prevent the passage of the bill of the hook therethrough, and a cover movably connected to one edge of the member and adapted to seat in said recess, said cover when in place completing an unbroken upper surface contour of the member.

In testimony whereof I affix my signature.

LOT DAVIS.